(12) United States Patent
Malhotra

(10) Patent No.: US 11,438,656 B2
(45) Date of Patent: Sep. 6, 2022

(54) UNIVERSAL USER PRESENTATION PREFERENCES

(71) Applicant: SLING Media PVT Ltd., Englewood, CO (US)

(72) Inventor: Yogesh Malhotra, Bengaluru (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 17/161,375

(22) Filed: Jan. 28, 2021

(65) Prior Publication Data
US 2022/0191591 A1 Jun. 16, 2022

(30) Foreign Application Priority Data
Dec. 16, 2020 (IN) ............................ 202041054717

(51) Int. Cl.
*H04N 21/45* (2011.01)
*H04N 21/431* (2011.01)
*H04N 21/258* (2011.01)
*H04N 21/442* (2011.01)
*H04N 21/441* (2011.01)

(52) U.S. Cl.
CPC ... *H04N 21/4532* (2013.01); *H04N 21/25891* (2013.01); *H04N 21/431* (2013.01); *H04N 21/441* (2013.01); *H04N 21/442* (2013.01)

(58) Field of Classification Search
CPC ............. H04N 21/4532; H04N 21/441; H04N 21/431; H04N 21/442; H04N 21/25891
See application file for complete search history.

(56) References Cited

U.S. PATENT DOCUMENTS

| 9,143,833 | B2* | 9/2015 | Christensen | ....... H04N 21/8166 |
| 10,515,398 | B2* | 12/2019 | Kosseifi | ............. G06F 16/9535 |
| 11,150,861 | B1* | 10/2021 | Thomas | ............ H04N 21/4312 |
| 2005/0246738 | A1* | 11/2005 | Lockett | ............. H04N 21/8547 725/43 |
| 2008/0186411 | A1* | 8/2008 | Kondo | ................. H04N 5/4403 348/734 |

(Continued)

*Primary Examiner* — Fernando Alcon
(74) *Attorney, Agent, or Firm* — Wash Park IP Ltd.; John T. Kennedy

(57) ABSTRACT

A system may include a presentation device and a hub coupled thereto. The hub has a hardware processor which executes first computer instructions facilitating a conditions engine and second computer instructions facilitating a preferences engine. The preferences engine may identify a presentation preference and generate a preference instruction based on the presentation preference. The conditions engine, upon receiving the preference instruction, may identify a presentation condition and output a condition instruction to the presentation device. The system may include the presentation device, upon receiving the condition instruction, being configured in accordance with the presentation condition. The presentation preference may be an abstract preference, a technical preference, or a default preference. The presentation preference may be identified by the preferences engine based on a presentation setting, such as a location. The presentation condition may include at least one of an abstract condition, a technical condition, and a default condition.

20 Claims, 2 Drawing Sheets

(56) References Cited

U.S. PATENT DOCUMENTS

| | | | |
|---|---|---|---|
| 2013/0047175 A1* | 2/2013 | Ramirez Flores | H04N 21/4223 |
| | | | 725/12 |
| 2015/0326903 A1* | 11/2015 | Reibman | H04N 21/25891 |
| | | | 725/116 |
| 2016/0037215 A1* | 2/2016 | Cardona | H04N 21/2747 |
| | | | 725/31 |
| 2017/0332036 A1* | 11/2017 | Panchaksharaiah | H04N 5/45 |
| 2019/0208282 A1* | 7/2019 | Singh | G08B 13/19665 |
| 2020/0014983 A1* | 1/2020 | McRae | G01S 13/765 |
| 2020/0169785 A1* | 5/2020 | Goodsitt | H04N 21/4318 |
| 2020/0204390 A1* | 6/2020 | Bekampis | H04N 21/4532 |
| 2020/0374586 A1* | 11/2020 | Kumar | H04N 21/41407 |

* cited by examiner

UNIVERSAL USER PRESENTATION PREFERENCES

TECHNICAL FIELD

The technology described herein generally relates to systems for facilitating universal use of user preferences for one or more content presentation settings across location, time, device, content type, content category, content, content provider, and otherwise.

BACKGROUND

Commonly, a household may include multiple persons, with a person having their own preferences for how and when content is presented at one or more settings such as volume settings, picture format, color schemes, font sizes, whether closed captioning is/is not enabled, and others.

For example, a senior citizen may prefer for a television newscast to be presented at a higher decibel level while another form of content is presented at a lower decibel level. Such user preferences may vary by a "presentation setting" such as one or more of a given location, time, device, content type, content category, content provider, and otherwise. Likewise, a second user may have second preferences that differ, in whole or in part, from the first user's preferences. For example, a child may prefer to have a cartoon presented at a lower decibel level than the level at which the first user prefers to have the newscast presented. Similarly, a first person may have a preference for a presentation condition, such as use of a picture-in-picture setting when watching multiple football games, while a second person may prefer to watch football games in a full screen view with one game being presented on a given display device, at a given time—and at a second presentation setting.

Available presentation devices, such as televisions and the like, are not commonly equipped to present a given content, at one or more content presentation settings, where different presentation settings may be associated with different persons. Presentation devices typically are configured to utilize one or more initial presentation settings regardless of user or other factors. Such initialized, or default, presentation settings are often configured once and when the presentation device is first set-up and initialized. Changing the initialized presentation settings is often non-intuitive, time consuming, not permitted, or otherwise inhibited.

Further, users often watch content across multiple devices. For example, one user may begin watching a football game on their smartphone and then continue watching on their home television. Different content presentation settings may be used with different presentation devices because of given presentation device having unique and/or different characteristics. The type of presentation device used may influence a given user's preferences and the one or more content presentation settings to be utilized with respect to the given one or more presentation devices. For example, when a smartphone is used, a given user may prefer to not watch the football games in a picture-in-picture setting, while using picture-in-picture on their home television. Today, devices, systems, and methods which automatically adjust to such differing preferences are needed.

Likewise, users often travel, whether to hotels, offices, friend's homes, or otherwise. As a user travels, often the content available to them at home, or on a given device, may also be available to them at the new location and/or on the new device (e.g., a hotel television). A given user's preferences for one or more presentation settings are not commonly available universally. A user will commonly adjust one or more content presentation settings as they travel or the like. Such efforts are often time consuming, if even possible.

Accordingly, devices, systems, and methods are needed which facilitate use of user presentation preferences universally across one or more presentation settings.

SUMMARY

The various implementations of the present disclosure describe devices, systems, and methods for facilitating use of user presentation preferences universally across one or more presentation settings. For at least one implementation, a CLOUD (as described below) based, universal usage of user preference settings with presentation devices is described.

At least one implementation of a system per the present disclosure may include a presentation device and a hub coupled to the presentation device. The hub may include a hardware processor operable to execute first, non-transient, computer instructions facilitating a conditions engine. The hub processor may also operate second, non-transient, computer instructions facilitating a preferences engine. The preferences engine may identify a presentation preference and generate a preference instruction based on the presentation preference. The conditions engine, upon receiving the preference instruction and based thereon, may identify a presentation condition and based thereon output a condition instruction to the presentation device.

An implementation feature of the system may include the presentation device, upon receiving the condition instruction, being configured in accordance with the presentation condition. The presentation preference may be at least one of an abstract preference, a technical preference and a default preference. The presentation preference may be identified by the preferences engine based on a presentation setting. The presentation setting may be a location. The presentation condition may include at least one of an abstract condition, a technical condition, and a default condition.

An implementation feature of the system may include a user device, coupled to the hub, that identifies a presentation setting to the hub. The preferences engine may identify the presentation preference in view of the presentation setting. The presentation setting may identify the presentation device.

An implementation feature of the system may include a server, coupled to the hub. The server may include a device settings database identifying a presentation condition for the presentation device. The presentation condition may include at least one of an abstract condition, a technical condition, and a default condition.

At least one implementation of a method for the present disclosure may include operations performed at a hub. Such operations may include one or more of: initialize at least one hub database; receive an identification of a given user; retrieve a presentation preference for the given user; receive an identification of a given content; establish a first link with a content provider of the given content; select a presentation device; determine a presentation setting; configure the presentation device based upon the presentation setting; in accordance with at least one presentation condition, establish a second link between the content provider and the presentation device; initiate presentation of the given content on the presentation device using the second link and in view of the at least one presentation condition; monitor, during presentation of the given content, for a change in the presentation setting; and when the change may be detected, adjust the at least one presentation condition.

An implementation feature of a method may include operations for use of at least one hub database that may include at least one of a presentation preferences database, a presentation settings database, and a device database. The presentation preference further may include at least one of an abstract preference, a technical preference, and a default preference. The presentation preference may correspond to at least one of an abstract condition, a technical condition, and a default condition. The presentation device may include a television. The presentation setting may specify at least one of a location, a time, the presentation device, a content type, a content category, the given content, and a content provider. The presentation condition may include at least one of an abstract condition, a technical condition, and a default condition. The presentation condition may correspond to a presentation preference that may include at least one of an abstract preference, a technical preference, and a default preference. The presentation preference may correspond to a presentation setting that may include at least one of a location, a time, the presentation device, a content type, a content category, the given content, and a content provider.

At least one implementing feature of the method may include operations for monitoring, during presentation of the given content, for a change in the presentation preference. When the change is detected, the operations may include adjusting the at least one presentation condition. The at least one presentation condition further may include at least one of an abstract condition, a technical condition, and a default condition. The operation may include monitoring, during presentation of the given content, for an identification of a new user; and when the change may be detected, adjusting the at least one presentation condition in view of the new user.

BRIEF DESCRIPTION OF THE DRAWINGS

The features, aspects, advantages, functions, modules, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1:
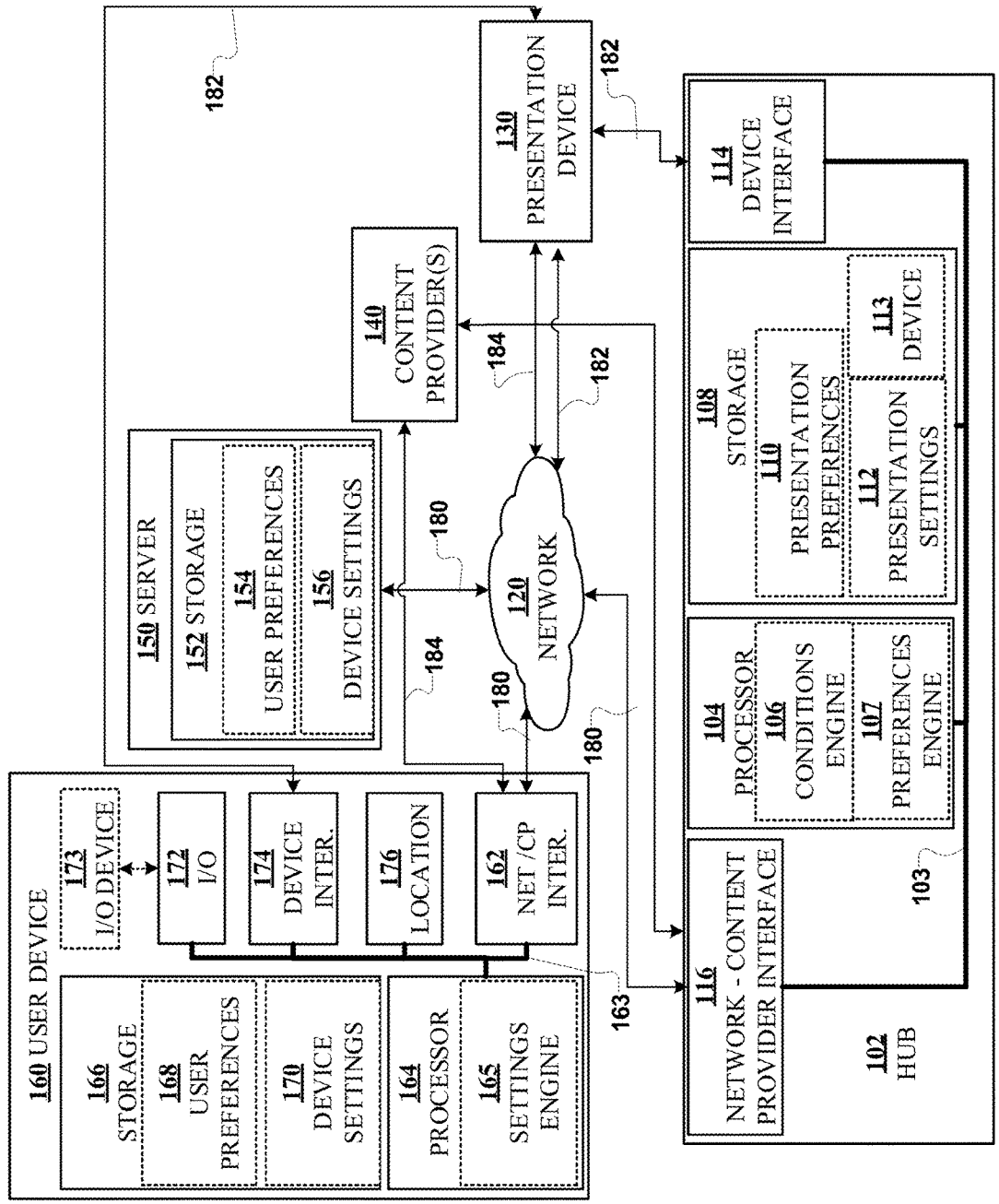
FIG. 1 is a schematic illustration of a system for facilitating use of user presentation preferences universally across one or more presentation settings and in accordance with at least one implementation of the present disclosure.

The various implementations of the present disclosure describe devices, systems, and processes for facilitating use of universal user presentation preferences across one or more presentation settings.

As used herein, "content" refers to a given specimen or collection of humanly perceptible information presented to one or more persons using a "presentation device" (as described below). Non-limiting examples of "content" include pictures, videos, television programs, audio programs, speeches, concerts, gaming, e-Books, audible books, papers, documents, songs, soundtracks, and otherwise. The content may originate from any source, be live and/or recorded, be provided in any formats such as standard reality, augmented reality, virtual reality, be generated or produced using any technologies, and or otherwise. A given content may be characterized by one or more of a "content type" (as described below), a "content category" (as described below), and the like.

As used herein, a "content type" refers to a type of content. For example and not by limitation, content types may include pictures, television programs, movies, songs, soundtracks, games, books, papers, documents, letters, and otherwise.

As used herein, a "content category" refers to a classification of content. The classification may be provided by any person or entity. Classifications may be provided, for example, by genre, author, producer, actor, artist, distributor, content ratings (such as those provided by the Motion Picture Association of America (MPAA ratings), and otherwise. For example and not by limitation, movie genres may include thrillers, horror, action, biographical, romance, and otherwise. Television genres may include sit-coms, crime, comedy, news, and otherwise. Music genres may include classical, country, rap, rock, and otherwise. Book genres may include fiction, non-fiction, and otherwise. Content and the categorization thereof may occur by any person or entity and using any known or later arising technologies. One non-limiting example of a categorizing technology is the use of social media "tags" and the like. Any content categories may be used with one or more implementations of the present disclosure and any given content may be associated with any number of content types and content categories.

As used herein, "live" refers to a transmission and presentation of content to one or more presentation devices that occurs within less than one minute of a first availability of such content for presentation to one or more users. "Recorded" refers to content first available for presentation to one or more users and where such content is delayed and/or later presented more than one minute after the first availability of such content, such as on an on-demand, time delayed, or other basis.

Content may be provided to a presentation device for presentation to one or more users directly or indirectly. As used herein, "directly" (with reference to content presentation) means without requiring use of an intermediary device, system, network or the like between a content provider and a given presentation device. For example, a presentation on a display of a smartphone of content captured by that smartphone occurs directly. As used herein, "(in)directly" (with reference to content presentation) means that a transmission of a given content from a source to a given user presentation device occurs using an intermediary server or system. For example and not by limitation, a presentation of content on a home television system, where the content is provided by a cable or satellite television provider, occurs indirectly, whereas a presentation of content on a home television system from a user's smartphone, using for example, screen-sharing technology, occurs directly. Further, Non-limiting examples of indirect providing of content includes streaming and over-the-top (OTT) content transmissions. Last, presentations of content directly and indirectly may include use of various network technologies, including local area networks (LAN), wide area networks, wireless and wired communication technologies, "Cloud" (as described below) technologies, and the like.

As used herein, a reference to "Cloud" includes without limitation references to cloud computing, cloud storage, cloud communications, and/or other technology resources. A usage of a Cloud resource may be private (limited to certain users and/or uses), public (available for many users and/or uses), hybrid, dedicated, non-dedicated, or otherwise. It is to be appreciated that any device or system of the various embodiments of the present disclosure may use Cloud resources to provide for processing, storage and other functions related to facilitating live and/or recorded content watch parties.

For at least one implementation, a presentation of a given content may include the presentation of audio and/or video at one or more presentation settings and pursuant to one or more "presentation conditions". Presentation conditions may include one or more "abstract conditions", "technical conditions", "default conditions", and/or combinations thereof. A non-limiting example of an abstract condition is a volume setting specified on a relative scale (e.g., low, medium, high). A non-limiting example of a technical condition is a specific decibel level, an audio processing technology to be utilized (such as, DOLBY and THX), one or more equalizer settings to utilize, or the like. A default condition may be used when a user or other entity has not specified a condition to use for a given content, content type, content category, or otherwise. For example, a default condition for a video presentation may be to use a 16:9, 4K format, and a specified brightness and dynamic range setting when a given presentation device is 4K compatible, and regardless of location. Default conditions may be specified by a manufacturer of a presentation device, a user, a content provider, or otherwise.

An abstract condition, technical condition, and/or default condition may vary by a given presentation setting. For example, an abstract condition for a volume level may vary by time (am/pm, late night, etc.), location (living room vs bedroom), or otherwise.

Similarly, abstract conditions for a video may include picture formats (such as, "television", "sports" and "game"), whether closed captioning is/is not enabled, and other condition that are provided on a general level of specificity. Technical conditions and default conditions for a video may include latency, quality, color gamut used, bit rate, and the like. For example, a technical condition may provide for video to be presented with "low latency" and at "high quality."

As used herein, "low latency" means a transmission of content from a source to a user device with less than a one second delay between the time of transmission of the content by the source and reception of such content by the user device. As used herein, "high quality" when referring to audio-video (A/V) content (for example and not by limitation) means that the content is transmitted by a content source directly, for example using a direct satellite connection, or indirectly, for example, using a network, to a user device at three or more megabytes per second (3 MBPS), at a video resolution equal to or greater than the 720p "high definition television" ("HDTV") standard. For at least one implementation, high quality may include the use of adaptive bit rate ("ABR") transmission technologies. Such ABR technologies may be configured to provide content at a "low latency" while using a varying video resolution over time. "Medium quality" means AV content that is transmitted by a content source to a user device at a "standard definition television" (SDTV) standard.

It is to be appreciated that a given content may be presentable, for a given presentation setting, at one or more abstract conditions, technical conditions, and/or default conditions. As discussed above, presentation settings may vary by one or more of a location, time, presentation device, content type, content category, content, content provider, and otherwise. Abstract conditions, technical conditions, and/or default conditions may also vary for one or more presentation settings. The various implementations of the present disclosure are not limited to use of any given abstract conditions, technical conditions, default conditions, or collections thereof for any given presentation setting.

As used herein, a "presentation preference" expresses a user's preference(s) in terms of one or more abstract preferences, technical preferences, and/or default preferences (e.g., no preference). For at least one implementation, abstract preferences correspond to abstract conditions, while technical preferences generally correspond to technical conditions. An abstract preference or technical preference provides when, where, how, and the like a user prefers to receive a given content. For example, a first user may prefer to be presented text in particular fonts, font sizes, font styles, or the like, while a second user may prefer one or more different fonts, and the like. Similarly, a first user may prefer a first color scheme for sports content, while preferring a second color scheme for news content. A default preference may be used when a user has not specified a preference for a given one or more presentation conditions. For example, a default video presentation preference may be a 16:9, 4K format when a given presentation device is 4K compatible. Default preferences may be specified by a manufacturer of a presentation device, a user, a content provider, or otherwise. A presentation preference may be defined in universal, generic, or other terms. A presentation preference may correspond to one or more presentation settings, when possible.

Presentation preferences may vary by user or otherwise. For example and not by limitation, a first presentation preference may specify that movies be presented in DOLBY surround sound (e.g., a technical preference) whenever possible. A first presentation setting, such as a home theatre, may include one or more presentation condition, such as a technical condition that facilitates presentation of the movie using DOLBY surround sound. Contrarily, a second presentation setting, such as a hotel room, may not include the technical condition(s) used to facilitate use of DOLBY surround sound. Under such a second scenario a device or system, according to an implementation of the present disclosure, may be configured to facilitate presentation of the movie using second (or alternative) presentation conditions—such second presentation conditions may include use of default presentation conditions (e.g., two-channel stereo), determined best-fit presentation conditions, based on user inputs, or otherwise.

It is to be appreciated that infinite permutations of presentation conditions may be associated with one or more presentation preferences, and any such permutations are considered to be within the scope of the presentation disclosure. Further, presentation conditions and/or presentation preferences may vary based on technologies available, including later arising technologies. Accordingly, presentation conditions may include one or more abstract conditions, technical conditions, and/or default conditions and presentation preferences may include one or more abstract preferences, technical preferences, and/or default preferences based on any known and/or later arising presentation setting, technologies, or otherwise.

System 100

As shown in FIG. 1, a system 100 for facilitating use of universal user presentation preferences across one or more presentation settings may include a hub 102 coupled directly, by a network 120, or otherwise to one or more presentation devices 130, a server 150, and to a user device 160. For at least one implementation, the user device 160 may be used in place of and/or in conjunction with the hub 102. That is, at least one implementation of the present disclosure may include a hub 102 and no user device 160, a user device 160 and no hub 102, and a user device 160 and a hub 102. Similar permutations of system 100 configurations may arise with respect to the server 150. It is to be appreciated that for at least one implementation, at least one of a hub 102, server 150 and a user device 160 are communicatively coupled to at least one presentation device 130 and such component(s) are configured to separately and/or in any combination thereof, control one or more presentation settings of a given presentation device 130 or a combination thereof.

Hub 102

The hub 102 may include various components common to computing devices today, and various other components provided pursuant to the present disclosure. Common components may include a bus 103 coupling two or more of the hub 102 components together, a hub processor 104, a hub storage device 108, one or more interfaces to external components such as a hub to device interface 114, and a hub to network/content provider interface 116, and others.

Other common components (not shown in FIG. 1) may include power modules, user input/output modules, and the like. Any known or later arising technologies may be used for such common components. Many of these components are further described below.

More specifically, the hub 102 may be further configured, for at least one implementation, to include a power module (not shown). The power module may include any known or later arising technologies which facilitate the use of electrical energy by the hub 102. Non-limiting examples of such technologies include batteries, power converters, inductive charging components, line-power components, solar power components, and otherwise.

The hub 102 may include any known or later arising human to device interface components, processes, and technologies. Non-limiting examples of input/output uses include audible inputs (such as spoken commands) and outputs (generated sound), visible inputs (such as eye tracking and facial recognition) and outputs (such as visible images presented on a display device, LEDs, or otherwise), touch inputs touch feedback (such as vibrations or other movements), gesture tracking, and otherwise. The hub 102 may be coupled to and/or include the one or more presentation devices 130. The presentation devices 130 facilitate interactions between an operator and the hub 102.

The hub 102 may include a security module (not shown). The security module may include any known or later arising security hardware components and/or computer instructions configured for use to secure data, communications regarding such data, hub processes and data, and otherwise. Security components may be used to facilitate secure transmission, processing, storage and otherwise of any data used in accordance with an implementation of the present disclosure. For at least one implementation, the security component may include a digital rights management (DRM) component. The DRM component may be configured to facilitate presentation of a given content under one or more given presentation conditions.

Non-common components may include one or more computer hardware/software executed engines (as further described below) such as a conditions engine 106 and a preference engine 107. It is to be appreciated that an engine is instantiated by a hardware processor executing non-transient computer instructions (as defined below) to perform one or more data processing, input/output, communications, control, or other tasks and activities. Other engines may be used in implementations of the present disclosure.

Other non-common components may include one or more databases provided by and/or under the direction and/or control of the hub storage device 108. Non-limiting examples of such databases may include a presentation preferences database 110, and a presentation settings database 112. Other databases may be used for a given implementation of the present disclosure.

It is to be appreciated that a hub 102 may be realized using any known or later arising computing device technologies. Non-limiting examples of computing devices that may be used, in whole or in part, as a hub 102 include desktop computers, laptop computers, tablet computing devices, servers, data storage modules, smartphones, gaming systems, cable/satellite set top boxes, Internet streaming devices, 10-Foot devices, network routers, smart home controllers, whole-home control devices, audio/video processors, home alarm systems, and the like.

Hub: Bus 103

As shown in FIG. 1, a hub 102 may include a bus 103 or other data communication technology that is configured to facilitate the transfer of data, power, and the like between various components of the hub 102. The bus 103 may use any known or later arising technologies, and may arise within and/or external to the hub 102. Non-limiting examples of bus technologies include peripheral component interconnect (PCI), compute express link (CXL), industry standard architecture (ISA), expanded industry standard architecture (EISA), IEEE-1394, PC Card, Thunderbolt, Fieldbus, eSATA, and other technologies.

Hub: Processor 104

As referenced above, a hub 102 may include a hub processor 104. For at least one implementation, the hub processor 104 may include a physical/hardware processor. For other implementations, the hub processor 104 may be instantiated as a virtual machine processor, or otherwise. The hub processor 104 may include a server central processing unit (CPU) or similar electrical data processing device. Any known or later arising CPU may be used. The hub processor 104 may be provided by any local processing device capable of executing one more non-transient computer executable instructions (herein, a "computer instruction") which, in accordance with an implementation of the present disclosure, facilitates one or more data processing operations including, and not limited to, the conditions engine 106 and the preferences engine 107.

The hub processor 104 may include one or more components configured for data processing operations. For at least one implementation, the hub processor 104 may include one or more hardware processors, such as 32-bit and 64-bit central processing units, multi-core ARM based processors, microprocessors, microcontrollers, and otherwise. The computer instructions may include instructions for executing one or more applications, engines, and/or processes configured to perform computer executable operations. Such hardware and computer instructions may arise in any given computing configuration including, and not limited to, local, remote, distributed, blade, virtual, or other configurations and/or systems configured for use in support of the one or more implementations of the present disclosure. Any known or later arising technologies may be utilized in conjunction with an implementation of the present disclosure to facilitate the hub processor 104, the conditions engine 106 and the preferences engine 107.

The hub processor 104 may be communicatively coupled, by the bus 103 or similar structure, to other components of the server including, and not limited to, a hub storage device 108, which may also be referred to as a "computer readable storage medium."

As used herein, an "engine" refers to at least one of a dedicated hardware, such as an application specific integrated circuit (an "ASIC"), a combination of hardware with specially purposed computer instructions, a combination of general purpose hardware, such as a CPU and non-volatile computer to perform certain data processing operations, and the like. It is to be appreciated that such engines may be provided separately, collectively, or otherwise by one or more correspondingly configured physical devices, systems, and/or collection of devices and systems, including, and not limited to, those provided using a distributed system or otherwise. The hub 102 may be any computing device capable of facilitating one or more of the operations described herein, and/or otherwise provided by an implementation of the present disclosure.

Hub: Processor: Conditions Engine 106

A conditions engine 106 may be instantiated by the hub processor 104. The conditions engine may be configured to perform computer instructions which generate output signals (herein, "condition instructions") which instruct one or more presentation devices 130, directly or indirectly, to adopt a current configuration in view of one or more abstract conditions, technical conditions, and/or default conditions. The condition instructions may be generated based upon data provided by one or more of the user device 160, the hub storage device 108, a server 150 (e.g., a NETFLIX server specifying that the content is available in 4K video), a content provider (e.g., DISNEY STUDIOS specifying when the video is available for home presentation), and otherwise.

For example and not by limitation, for a presentation setting of a home theatre (a location), at evening (a time), for a home theatre projector (a first presentation device) and a multi-channel receiver (a second presentation device), an action move (a content type), provided by a streaming service (a content provider), in 4K video (a content type), the condition instructions may include instructions which configure the projector and the multi-channel receiver according to one or more technical conditions (e.g., THX with 16:9 video at 4K) and at a volume corresponding to an abstract condition. The condition instructions may further include settings based upon one or more presentation preferences, such as minimum and maximum volume settings, parental control settings, and otherwise.

The conditions engine 106 may be configured to generate condition instructions across one or more device types. For example and not by limitation, the conditions engine 106 may be configured to generate condition instructions based upon an operating system that a given presentation device utilizes. Non-limiting examples of operating systems include WINDOWS, MAC, UNIX, LINUX, and others. The conditions engine 106 may be configured to translate computer instructions for a first operating system into computer instructions for a second operating system, for example, by identifying lower level schemes, routines, or the like used for the first operating system and identify corresponding and/or alternative schemes, routines in the like in the second operating system.

Similarly, the conditions engine 106 may be configured to generate instructions universally across presentation devices based upon any given conceptual framework, such as the Open Systems Interconnection (OSI) model. For example and not be limitation, presentation conditions specified with reference to an ANDROID operating system may be translated by the conditions engine 106 into presentation conditions supported by an APPLE operating system, such as the iOS 14 operating system provided by Apple, Inc. of Cupertino, Calif. By further non-limiting example, the conditions engine 106 may be configured to generate condition instructions based upon a given presentation setting. For example, a resolution, color scheme, contrast setting, picture type (e.g., widescreen vs letter box), font size, font color, favorite channel listing, or the like may be one or more presentation settings that the conditions engine 106 may utilize in generating one or more computer instructions for configuring one or more presentation devices.

For at least one implementation, the conditions engine 106 may be configured to reconfigure or reset one or more presentation devices to default or previously set settings. For example and not by limitation, when a user is staying in a hotel room (a presentation setting), the conditions engine 106 may provide first computer instructions to a presentation device (such as a TV) in the hotel room (the "hotel TV"). The first computer instructions may configured the hotel TV to one or more abstract conditions and/or technical conditions. When the user departs the hotel, "reset" computer instructions may be generated by the conditions engine 106 and communicated to the hotel TV, which reset the TV to its default conditions and thereby remove personal private or other information relating to the user from the hotel TV. For at least one implementation, the conditions engine 106 may be configured to generate the reset computer instructions based upon a user input, a calendar function (e.g., a scheduled hotel departure time), after an elapsed time, based upon data received from the user device 160, server 150, or otherwise. For at least one implementation, the conditions engine 106 may be configured to establish one or more world-wide-web (Web) sockets which facilitate the providing of content to a give user based upon one or more abstract conditions, technical conditions, and/or default conditions. Such Web sockets may be instantiated by the conditions engine 106 for any given purpose, use, duration, presentation device, or otherwise. The conditions engine 106 may be configured to establish such Web sockets based upon a given event—for example, a user checking into a hotel. The Web sockets may be associated with a given hotel room automatically, for example, by a hotel server, manually, for example, by a user specifying a MAC or similar address for a given presentation device, or otherwise. The conditions engine 106 may be configured to break-down such Web sockets, when use thereof is no longer scheduled, specified, permitted, or otherwise, such as when the user checks out of the hotel.

The conditions engine 106 may be further configured to obtain a given user's presentation preferences from any source, such as the hub storage device 108, a server 150 (for example, a FACEBOOK server), a user device 160, or otherwise. The user's presentation preferences may be used in generating one or more condition instructions that are provided to one or more presentation devices. The conditions engine 106 may be configured to use any data source in generating condition instructions.

The conditions engine 106 may be further configured to generate condition instructions based upon device data obtained from a device database 113, a server 150, or otherwise.

Hub: Processor: Preferences Engine 107

A preferences engine 107 may be instantiated by the hub processor 104. The preferences engine 107 may be configured to execute computer instructions for use in identifying one or more presentation preferences for a given user. The preferences engine 107 may use one or more of user inputs, artificial intelligence processes, machine learning, pattern recognition, predictive learning, or the lie in identifying presentation preferences.

The preferences engine 107 may be configured to perform computer instructions which, for a given one or more persons, determine, define, allocate, specify, or otherwise identify (herein collectively, "define") and provide a "preference instruction." Presentation preferences may be generated based for a given one or more presentation settings and the preference instruction(s) may be provided to the conditions engine 106 for use thereby in configuring a presentation device 130. Presentation preferences and presentation instructions may be standard or specific to a given presentation setting, common to two or more persons (e.g., members of a household), or otherwise.

It is to be appreciated that the preferences engine 107 may be configured to use any known or later arising technologies which facilitate defining, in advance, real-time or otherwise, presentation preferences and generating one or more preference instructions for one or more persons, and at any given level of specificity.

Hub: Storage Device 108

The hub 102 may include a hub storage device 108. The hub storage device 108 may be a single storage device, multiple storage devices, or otherwise. The hub storage device 108 may be configured to store presentation preferences data, for one or more users, in a presentation preferences database 110, presentation settings data in a presentation settings database 112, device data in a device database 113, and other data.

The hub storage device 108 may be provided locally with the hub 102 or remotely, such as by a data storage service provided on the Cloud, and/or otherwise. Storage of data may be managed by a storage controller (not shown) or similar component. It is to be appreciated such a storage controller manages the storing of data and may be instantiated in one or more of the hub storage device 108, on/with the hub processor 104, on the Cloud, or otherwise. Any known or later arising storage technologies may be utilized in conjunction with an implementation of the present disclosure to facilitate the hub storage device 108.

Available storage provided by the hub storage device 108 may be partitioned or otherwise designated by the storage controller as providing for permanent storage and temporary storage. Non-transient data, computer instructions, or other the like may be suitably stored in the hub storage device 108. As used herein, permanent storage is distinguished from temporary storage, with the latter providing a location for temporarily storing data, variables, or other instructions used for a then arising data processing operations. A non-limiting example of a temporary storage device is a memory component provided with and/or embedded onto the hub processor 104. Accordingly, it is to be appreciated that a reference herein to "temporary storage" is not to be interpreted as being a reference to transient storage of data. Permanent storage and/or temporary storage may be used to store either, if not both, transient and non-transient computer instructions, and other data.

Hub: Storage: Presentation Preferences Database 110

As discussed above, the hub storage device 108 may include a presentation preferences database 110. The presentation preferences database 110 may include any data regarding one or more presentation preferences for a user or a collection of users. Presentation preferences may include any form of data useful in specifying a presentation preference. Non-limiting examples of such data include demographic, psychographic, medical, personal, and other data. For example, an indication that a given user speaks English may result in a presentation preference for content to be provided in English. Data in the presentation preferences database 110 may be used by one or more of the conditions engine 106 and the preferences engine 107.

Hub: Storage: Presentation Settings Database 112

The hub storage device 108 may include a presentation settings database 112. The presentation settings database 112 may include any data regarding one or more presentation settings and one or more presentation conditions associated with a given of the one or more presentation settings. For example, an identification of an abstract condition to be used for content presented in a bedroom may be stored in the presentation settings database 112. The presentations settings data may be populated in the presentation settings database by the preferences engine 107, by the user device 160, the server 150, have a default condition which is used until changed, or otherwise.

Hub: Storage: Device Database 113

The hub storage device 108 may include a device database 113. The device database 113 may be configured to provide data regarding one or more of features, functions, capabilities, limitations, or the like of one or more presentation devices 130. The device data may include one or more abstract conditions and/or technical condition which a given device may perform or be configured to perform The device database 113 may be populated with device data obtained from any source including and not limited to the presentation preferences database 110, the presentation settings database 112, the user device 160, the server 150, a presentation device 130, a content provider 140, and otherwise.

Hub: Interfaces 114/116

The hub 102 may include one or more hardware and software interfaces which facilitate the transfer of data, power and/or other signals by, between, to, from, as an intermediary, or otherwise between a hub 102 and one or more external devices. An interface may support use of one or more communications, networking, power, or other technologies, standards, protocols, and the like (herein, "technologies"). Interfaces are well known in the art and one non-limiting example includes network interface cards ("NICs"). NICs may be configured for example, and not by limitation, to support technologies including Wi-Fi, BLUETOOTH', cellular, and otherwise. As shown in FIG. 1, multiple interfaces may be provided in a given hub 102. It is to be appreciated that such interfaces may be defined virtually with one or more commonly utilized technologies being used to support multiple interface features and/or functions. Non-limiting examples of interfaces include a hub to device interface 114, and a hub to network/content provider interface 116.

Presentation Devices 130

The system 100 may include one or more presentation devices 130. As used herein, a presentation device 130 is any device that is configured and/or may be configured, as of a given time, for presentation of a given content to one or more users in accordance with at least one presentation condition. Any known or later arising device may be used in accordance with an implementation of the present disclosure.

Links 180/182/184

The system 100 may include one or more "links" which couple the hub 102 to one or more networks 120, presentation devices 130, content providers 140, servers 150, and/or user devices 160, and at any given time. Non-limiting examples of links utilized may include network links 180, presentation device links 182, and content links 184. The one more links may be combined or provided separately with respect to any given presentation setting.

As used herein, a "link" may be configured to facilitate by, between, to or from, a first component, such as the hub 102, and one or more second components such as a presentation device 130. The link may be direct or indirect. A given link may facilitate communication of data, providing of power, and otherwise.

A link may using any known or later arising technologies, standards, protocols, or otherwise (herein, "technologies") which facilitate a providing of one or more features and a supporting of one or more functions. For example and not by limitation, a given link may include use of Wide Area Networks (WAN), Cloud based networks, private networks, public networks, such as the Internet, the Public Switched Telephone Networks (PSTN), Plain Old Telephone Service (POTS), circuit switched networks, WANs, wireless communications technologies, such as 3G/4G/5G cellular, and the like.

For at least one implementation, a given link may utilize mid-band and/or high band 5G communications frequencies. As is commonly known and appreciated, mid-band 5G communications frequencies typically support communications of 100-400 Mb/s download and are typically deployed over 2.4 GHz to 4.2 GHz frequencies. Likewise, high band 5G communications frequencies typically support communications of 1-2 Gb/s download and are typically deployed over 24-72 GHz frequencies. For at least one implementation, one or more communications and networking standards and/or protocols may be used including the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others. It is to be appreciated that any selection of links may be combined or provided as single, multiple, or other combinations for at least one implementation. Accordingly, it is to be appreciated that the links are described herein for purposes of functional explanation and are not limited to any particular physical configurations.

A given link may utilize localized links such as those provided by Local Area Networks (LAN), BLUETOOTH™, near-field communications (NFC), Ethernet, fiber-optic, Wi-Fi, Internet of Things (IoT), Narrow-Band Internet of Things (NB-IoT), copper twisted pair cables, and others. It is to be appreciated that any given link may use one or more of any of technologies identified above and other known and/or later arising technologies. A link may use wired, wireless, and/or combinations of wired and wireless technologies. A link may use wireless technologies during certain operating periods, wired technologies during others, and combinations of wired and wireless technologies at any given time.

Network 120

The system 100 may include use of one or more networks 120. A network 120 may include any combination of two or more components or systems configured to communicate, store, process, manage, or otherwise manipulate data therebetween. Non-limiting examples of networks include WANs, for example, the Internet, LAN, Cloud based networks, private networks, public networks, and otherwise. The networks 120 may also include and/or be coupled to one or more servers 150, non-limiting examples include web servers.

Presentation Device(s) 130

The system 100 includes one or more presentation devices 130. A presentation device 130 may include any device configured to present information in a humanly perceptible format, such as audibly, visually, or otherwise. Non-limiting examples of presentation devices 130 include smartphones, laptop computers, tablet computing devices, desktop computers, televisions, smart glasses, virtual reality glasses, augmented reality glasses, earbuds/headphones and other audible output devices, holographic displays, movie theatres, and other devices and systems configured to present content to a one or more persons in a humanly perceptible format.

Content Provider(s) 140

The system 100 may include one or more content providers 140. Content may be made available, provided, presented, transmitted by a producer, publisher, distributor, or other source of such content (herein, a "content provider"). A content provider may include any person or entity providing content for presentation to themselves and/or others. The content provider may be a given user, another person, another entity, an automated device, system, and process, and otherwise. Non-limiting examples of content providers include entities, such as SLING TV, NETFLIX, AMAZON PRIME, COX cable, DISH Network, DIRECT, television networks, (such as ABC, NBC, CBS, FOX and others), social media providers (such as, FACEBOOK, TWITTER, and others), and other entities. Further, a content provider may include a user themself. For example and not by limitation, using a camera on a smartphone, a user may capture still pictures, videos, audio, or other content and present it to themselves and/or others using the same presentation device or other presentation devices.

Server 150

The system 100 may include one or more servers 150. The server(s) 150 may be configured to facilitate use of universal user presentation preferences by storing data such as presentation preferences data, presentation settings data, device data, and the like. For at least one implementation, the server 150 may include a server storage device 152 configured to store a mirror image of one or more data sets stored by the hub storage device 108 in a user preferences database 154 and a device settings database 156. The server 150 may be configured to provide data that is in lieu of and/or additional to data stored by the hub storage device 108—a non-limiting example being device data for a presentation device at a remote location, such as a hotel room. The server(s) 150 may also provide for control of presentation devices, for example by sending device control codes over one or more networks 120 and presentation device links 182 coupling a given presentation device 130 to a given server 150. It is to be appreciated that one or more functions, features and/or capabilities of a hub 102 may be facilitated in whole or in part by one or more servers 150. As is well known, servers 150 typically include one or more processors configured to execute computer instructions. Such instructions may be facilitate the providing of one more features and/or functions of a given implementation of a system 100.

User Device 160

As discussed above, the system 100 may include a user device 160. For at least one implementation, any known or later arising user device 160 may be used. Non-limiting examples of a user device 160 include smartphones, laptop computers, tablet computing devices, desktop computers, smart televisions, smart glasses, virtual reality glasses, augmented reality glasses, earbuds/headphones and other audible output devices, and other devices. The user device 160 may be communicatively coupled to one or more of the hub 102, servers 150, presentation devices 130, network 120, or otherwise.

User Device: Network/Content Provider Interface Module 162

The user device 160 may include a network/content provider interface module 162. The network/content provider interface module 162 may communicatively couple the user device 160 to one or more of the hub 102, the server 150, and the content providers 140. Such coupling may occur using the network 120 and one or more links, such as a network link 180 and a content link 184. The user device 160 may output data to the hub 102 and other elements, as further described herein.

User Device: Processor 164

The user device 160 may be configured to include a user device processor 164. The user device processor 164 may be configured similarly to and/or have less, the same, or more of the capabilities of the hub processor 104, as described above. For purposes of conciseness, such capabilities are not repeated here. Any know or later arising CPU technologies may be used as the user device processor 164. The user device processor 164 may be communicatively coupled, by a user device bus 163 or similar structure, to other components of the user device 160. The user device processor 164 may be configured to execute computer instructions for instantiating a settings engine 165. The settings engine 165 may include computer instructions for one or more of a conditions engine and a preferences engine, such engines may be configured to include capabilities, features, and functions of the conditions engine 106 and the preferences engine 107 of the hub 102. For at least one implementation, the settings engine 165 may be used in place of and/or in addition to one or more of the conditions engine 106 and/or the preferences engine 107.

User Device: Storage Device 166

The user device 160 may be configured to include a user device storage device 166, which may also be referred to as a "computer readable storage medium." Any known or later arising technology may be used for the user device storage device 166 including those described above with respect to the hub storage device 108.

For at least one implementation, the user device 160 may include a user device storage device 166 configured to store a mirror image of one or more data sets stored by the hub storage device 108 including user preferences database 168 and a device settings database 170. The user device 160 may be configured to provide data that is in lieu of and/or additional to data stored by the hub storage device 108—a non-limiting example being preferences data for a given user based upon one or more characteristics of such user, such as, reducing a volume preference setting when a user's heart rate indicates the user is resting.

User Device: Input/Output Module 172

The user devices 160 may be further configured, for at least one implementation, to include a user device input/output module 172 for use in coupling the user device 160 with one or input/output devices 173. Input/output devices 173 may be provided in conjunction with and/or separate from the user device 160. The user devices input/output module 172 may include any known or later arising interface components, processes, and technologies to couple the user device 160 with one or more input/output devices 173. Non-limiting examples of input/output devices 173 include microphones, speakers, displays, cameras, light emitting diodes (LEDs), touch inputs, devices providing touch feedback (such as vibrations or other movements), gesture tracking components, keyboards, mice, and otherwise. The user device input/output module 172 may be coupled to and/or include the one or more presentation devices 130. For at least one implementation, a user device user input/output module 172 may be configured to include one or more of an audio input/output (I/O) module, a visual I/O module, a text I/O module, a gesture I/O module and/or other interface modules. Various non-limiting features and functions of such I/O modules are described herein.

Audio I/O Module: Audio I/O modules may be configured to support the providing of audible signals to and from a user. Such audio signals may include spoken text, sounds, or any other audible information. Such audible information may include one or more of humanly perceptible audio signals, where humanly perceptible audio signals typically arise between 20 Hz and 20 KHz. For at least one implementation, the range of humanly perceptible audio signals may be configurable to support an audible range of a given monitored person.

For at least one implementation, an audio I/O module generally includes hardware and computer instructions (herein, "audio technologies") which supports the input and output of audible signals with a user. Such audio technologies may include, and not limited to, noise cancelling, noise reduction, technologies for converting human speech to text, text to speech, translation from a first language to one or more second languages, playback rate adjustment, playback frequency adjustment, volume adjustments and otherwise. Non-limiting examples of audio technologies that may be utilized in an audio I/O module include GOOGLE VOICE, SFTRANSCRIPTION, BRIGHTSCRIPT, GOOGLE ASSISTANT, SIRI, and others.

In at least one implementation, an audio I/O module may be configured to use one or more microphones and speakers to capture and present audible information to a user. Such one or more microphones and speakers may be provided by a given user device 160 itself or by a device communicatively couple additional audible device component, for example, by earbuds may be communicatively coupled to a smartphone, with the earbuds functioning as an audio I/O module and capturing and presenting audio sounds to and from user, while the smartphone functions as a user device 160. Accordingly, it is to be appreciated that any existing or future arising audio I/O devices, systems and/or components may be utilized.

Visual I/O Module: For at least one implementation, a user device 160 may include a visual I/O module configured to support the providing of visible signals to a user. Such visible signals may be in any form, such as still images, motion images, augmented reality images, virtual reality images, and otherwise. Such visible information may include one or more of humanly perceptible visible signals. For at least one implementation, a visual I/O module may also be configured to capture non-humanly visible images, such as those arising in the X-ray, ultra-violet, infra-red or other spectrum ranges. Such non-humanly visible images may be converted into humanly visibly perceptible images by a user device 160.

For at least one implementation, a visual I/O module generally includes hardware and computer instructions (herein, "visible technologies") which supports the input by and output of visible signals. Such visible technologies may include technologies for converting images (in any spectrum range) into humanly perceptible images, converting content of visible images into a given user's perceptible content, such as by character recognition, translation, playback rate adjustment, playback frequency adjustment, and otherwise.

A visual I/O module may be configured to use one or more display devices configured to present visible information to a monitored person. A visual I/O module may be configured to use one or more image capture devices, such as those provided by lenses, digital image capture and processing software and the like which may be provided by a given user device itself or by a communicatively coupled additional image capture device component, for example, a remote camera in a vehicle or otherwise. Accordingly, it is to be appreciated that any existing or future arising visual I/O devices, systems and/or components may be utilized by and/or in conjunction with a user device to facilitate the capture, communication and/or presentation of visual information.

Text I/O Module: For at least one implementation, a user device 160 may include a text I/O module configured to support the providing of textual information input by a user. Such textual information signals may be in any language, format, character set, or otherwise. Such textual information may include one or more of humanly perceptible characters, such as letters of the alphabet or otherwise. For at least one implementation, a text I/O module may also be configured to capture textual information in first form, such as a first language, and convert such textual information into a second form, such as a second language.

A text I/O module generally includes hardware and computer instructions (herein, "textual technologies") which supports the input by and output of textual information signals to a monitored person. In at least one implementation, a text I/O module may be configured to use an input device, such as a keyboard, touch pad, mouse, or other device to capture textual information. It is to be appreciated that any existing or future arising text I/O devices, systems and/or components may be utilized by and/or in conjunction with a user device 160 to facilitate the use of textual information.

Gesture I/O Module: For at least one implementation, a user device 160 may include a gesture I/O module configured to support the providing of gesture information, such as sign language, by a user. Such gesture information signals may be in any form or format. Such gesture information may include one or more of humanly perceptible characters, such as those provided by sign language. For at least one implementation, a gesture I/O module may also be configured to capture a monitored person's motions to control one or more aspects of a user device, examples of such motions including those commonly used on smartphone touch interfaces.

A gesture I/O module generally includes hardware and computer instructions (herein, "gesture technologies") which supports the input by and output of gesture information signals to user. Such gesture technologies may include technologies for inputting, outputting, and converting gesture content into any given form, such as into textual information, audible information, visual information, device instructions or otherwise. In at least one implementation, a gesture I/O module may be configured to use an input device, such as a motion detecting camera, touch pad, mouse, motion sensors, or other devices configured to capture motion information.

It is to be appreciated that any existing or future arising gesture I/O devices, systems and/or components may be utilized by and/or in conjunction with a user device 160.

User Device: Presentation Device Interface 174

The user devices 160 may be further configured, for at least one implementation, to include a presentation device interface 174 for use in coupling the user device 160 with one or presentation devices 130. The presentation device interface 174 may include any known or later arising interface components, processes, and technologies to couple the user device 160 with one or more presentation devices 130. Non-limiting examples, include HDMI and other video ports, speaker ports, sound cards, video cards, and the like.

User Device: Location Detector 176

For at least one implementation, a user device 160 may include a user device location detector 176. The user device location detector 176 may use any known or later arising location detection technologies, non-limiting examples include use of the Global Positioning Satellite system. For at least one implementation, location information may be used in determining one or more device settings to utilize to present content according to a given presentation setting. For example and not by limitation, a location corresponding to a parking lot located near a sports stadium may be used in setting one ore presentation conditions that correspond to such location—such as presenting video content at a higher brightness level during daytime in order to reduce effects of sun glare on a user's perception of video content to be presented by the presentation device.

User Device: Power Module

The user device 160 may be further configured, for at least one implementation, to include a user device power module (not shown). The user device power module may include any known or later arising technologies which facilitate the use of electrical energy by a user device 160. Non-limiting examples of such technologies include batteries, power converters, inductive charging components, line-power components, solar power components, and otherwise.

User Device: Security Module

The user device 160 may be further configured, for at least one implementation, to include a user device security module (not shown). The user device security module may include any known or later arising security hardware components and/or computer instructions configured for use to secure user device processes and data, and otherwise. Security components may be used to facilitate secure transmission, processing, storage and otherwise of any data used in accordance with an implementation of the present disclosure.

Figure 2:
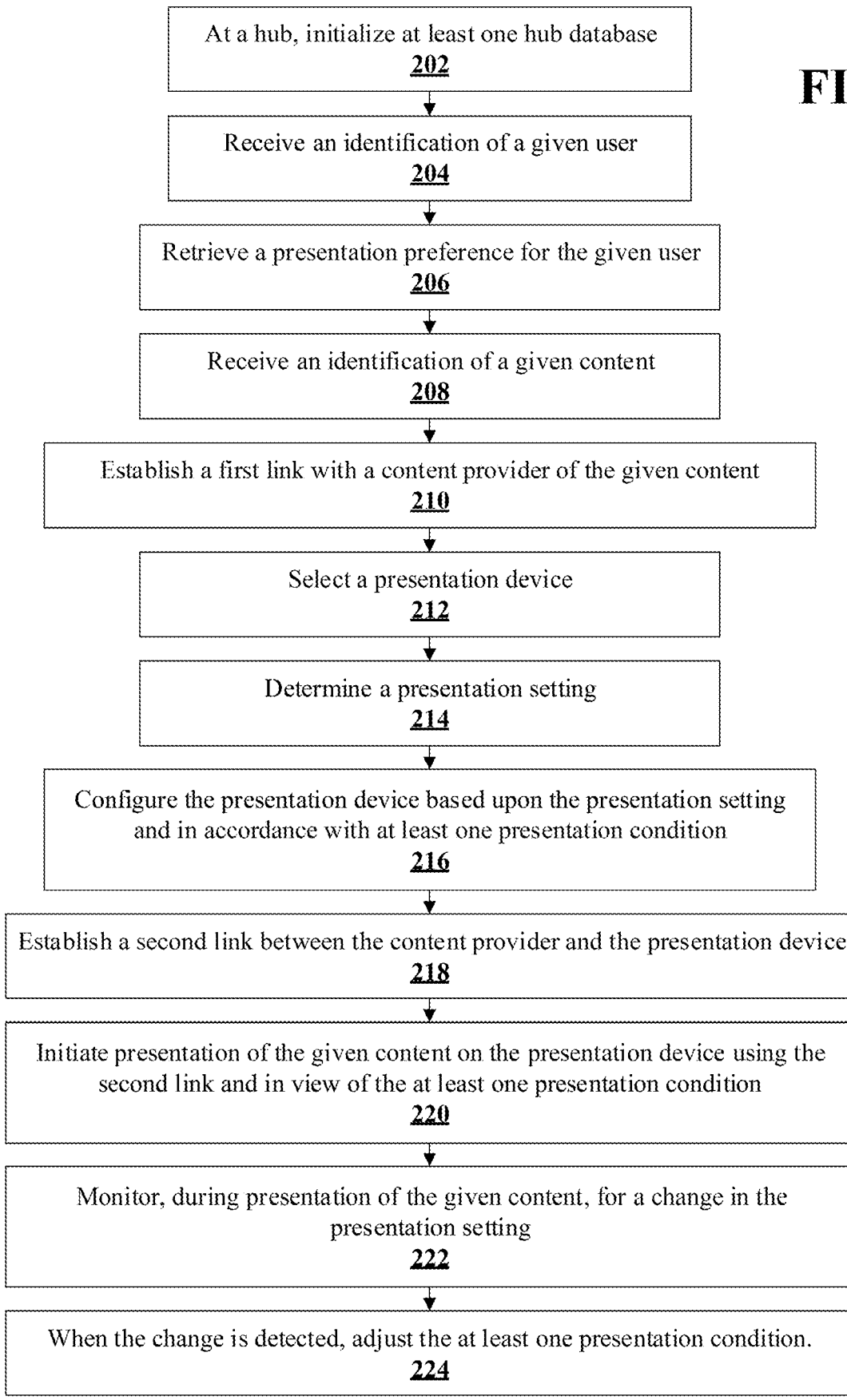
FIG. 2 is a flow diagram illustrating a method for facilitating use of universal user presentation preferences across one or presentation settings and in accordance with at least one implementation of the present disclosure.

In FIG. 2, a method for facilitating use of universal user presentation preferences and in accordance with at least one implementation of the present disclosure by a hub 102 is shown. It is to be appreciated that the operations shown are described with reference to the hub 102 may be performed, in whole or in part, by one or more of the hub 102, server 150, and user device 160.

Per Operation 202, the process may include an operation of initialize at least one hub database. Initializing of the at least one hub database may include selecting data from, and/or populating data into one or more of a presentation preferences database 110, a presentation settings database 112, and a device database 113. It is to be appreciated that the populating of such databases may occur, in whole or in part, at any time. The databases may be updated with new data for use with new presentation devices 130, based on a change in location, at any time, and/or otherwise. For at least one implementation, the initializing of the databases may include initializing one or more databases provided by the hub 102, server 150, and/or user device 160.

Per Operation 204, the process may include an operation of receive an identification of a given user. For at least one implementation, the identification of the given user may be received directly by the hub 102. For another implementation, the identification of the given user may be received first by a user device 160 coupled to the hub 102 and then provided by the user device 160 to the hub 102. For an implementation, an identification of the user may not be made when a default user is to be used. For at least one implementation, an identification of a user may include an identification of a new user, such identification may further include populating a presentation preferences database with data regarding the new user.

Per Operation 206, the process may include an operation of retrieve a presentation preference for the given user. As discussed above, a presentation preference may include at least one of an abstract preference, a technical preference, and a default preference. For an implementation, the presentation preference may correspond to at least one of an abstract condition, a technical condition, and a default condition.

Per Operation 208, the process may include an operation of receive an identification of a given content. The identification of the given content may be received in any manner. For example and not by limitation, a user, time, automated process, or otherwise may select a channel, a program, a specified content presented on a display, or otherwise. Any known or later arising technologies for selecting of content, from a given one or more content providers, may be used.

Per Operation 210, the process may include an operation of establish a first link with a content provider 140 of the given content. The first link may include use of a network 120 and a network link 180 and/or a content link 184.

Per Operation 212, the process may include an operation of select a presentation device 130. As discussed above, the presentation device may include one or more devices, such as televisions, stereo systems, and the like. The presentation device selection may occur automatically, for example based on a schedule, based upon user input, be permanently configured, for example a hub is connected to a given television for use as the presentation device, or otherwise.

Per Operation 214, the process may include an operation of determine a presentation setting. As discussed above, a presentation setting may specify at least one of a location, a time, the presentation device, a content type, a content category, the given content, and a content provider.

Per Operation 216, the process may include an operation of configure the presentation device based upon the presentation setting and in accordance with at least one presentation condition. As discussed above, a presentation condition may include an abstract condition, a technical condition, and a default condition. For at least one implementation, the presentation condition may correspond to a presentation preference that includes at least one of an abstract preference, a technical preference, and a default preference. The presentation preference may correspond to a presentation setting.

Per Operation 218, the process may include an operation of establish a second link between the content provider 140 and the presentation device 130. The second link may include use of one or more of a network 120, a network link 180, and/or a presentation device link 182.

Per Operation 220, the process may include an operation of initiate presentation of the given content, on the presentation device, using the second link, and in view of the at least one presentation condition.

Per Operation 222, the process may include an operation of monitor, during presentation of the given content, for a change in the presentation setting.

Per Operation 224, the process may include an operation of, when a change is detected, adjust the at least one presentation condition.

The process may also include operations (not shown in FIG. 2) for monitoring in a change in one or more of a presentation preference and a user. In view of such a change, one or more presentation conditions may be changed.

It is to be appreciated that the operations described above and depicted in FIG. 2 are illustrative and are not intended herein to occur, for a given implementation of the present disclosure, in the order shown, in sequence, or otherwise. One or more operations may be performed in parallel and operations may be not performed, as provided for any given use of an implementation of the present disclosure.

Although various implementations of the claimed invention have been described above with a certain degree of particularity, or with reference to one or more individual implementations, those skilled in the art could make numerous alterations to the disclosed implementations without departing from the spirit or scope of the claimed invention. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various implementations of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of implementations and not limiting. Changes in detail or structure may be made without departing from the basic elements of the invention as defined in the following claims.

What is claimed is:

1. A method comprising:
   at a hub:
   initialize at least one hub database;
   receive an identification of a given user;
   retrieve a presentation preference for the given user;
   receive an identification of a given content;
   establish a first link with a content provider of the given content;
   select a presentation device;
   determine a presentation setting;
   determine a presentation device operating system utilized by the presentation device;
   determine whether the presentation device operating system is compatible with the given content;
   when compatible,
      generate first condition instructions; and
      configure the presentation device based upon the first condition instructions; and
   when not compatible,
      convert the first condition instructions into second condition instructions compatible with the presentation device operating system; and
      configure the presentation device based upon the second condition instructions; and
         wherein the first condition instructions and the second condition instructions identify at least one presentation condition;
   establish a second link between the content provider and the presentation device; and
   initiate presentation of the given content on the presentation device using the second link and in view of the at least one presentation condition;
   monitor, during presentation of the given content, for a change in the presentation setting; and
   when the change is detected, adjust the at least one presentation condition.

2. The method of claim 1,
   wherein the at least one hub database comprises at least one of a presentation preferences database, a presentation settings database, and a device database.

3. The method of claim 2,
   wherein the presentation preference further comprises at least one of an abstract preference, a technical preference, and a default preference.

4. The method of claim 3,
   wherein the presentation preference corresponds to at least one of an abstract condition, a technical condition, and a default condition.

5. The method of claim 1,
   wherein the presentation device comprises a television.

6. The method of claim 1,
   wherein the presentation setting specifies at least one of a location, a time, the presentation device, a content type, a content category, the given content, and a content provider.

7. The method of claim 1,
   wherein the presentation condition includes at least one of an abstract condition, a technical condition, and a default condition.

8. The method of claim 7,
   wherein the presentation condition corresponds to a presentation preference comprising at least one of an abstract preference, a technical preference, and a default preference; and
   wherein the presentation preference corresponds to a presentation setting comprising at least one of a location, a time, the presentation device, a content type, a content category, the given content, and a content provider.

9. The method of claim 1, further comprising:
   monitor, during presentation of the given content, for a change in the presentation preference; and
   when the change is detected, adjust the at least one presentation condition.

10. The method of claim 9,
    wherein the at least one presentation condition further comprises at least one of an abstract condition, a technical condition, and a default condition.

11. The method of claim 1, further comprising:
    monitor, during presentation of the given content, for an identification of a new user; and
    when the change is detected, adjust the at least one presentation condition in view of the new user.

12. A system comprising:
    a presentation device executing a presentation device operating system; and
    a hub coupled to the presentation device, further comprising:
       a hardware processor operable to execute:
       first, non-transient, computer instructions which instruct the hub to perform operations comprising:
          receiving a technical condition for a first content;
          receiving a presentation preference for a user;
          generating, based on the technical condition and the presentation preference, a presentation instruction for the first content;
          determining the presentation device operating system;
          determining whether the presentation instruction is supported by the presentation device operating system;
             when supported, outputting a condition instruction which instructs the presentation device to implement the presentation instruction; and
             when not supported,
                converting the presentation instruction into a second presentation instruction supported by the presentation device operating system; and
                outputting, based on the second presentation instruction, a converted condition instruction which instructs the presentation device to implement the second presentation instruction; and
       wherein the presentation device, pursuant to the converted condition instruction, presents the first content to the user.

13. The system of claim 12,
    wherein the presentation preference is at least one of an abstract preference, a technical preference and a default preference.

14. The system of claim 12,
    wherein the presentation preference is identified by based on a presentation setting comprising at least one of a resolution, color scheme, contrast setting, picture type, font size, and font color.

15. The system of claim 12, further comprising:
    a server;
       wherein the server includes a data store storing the presentation preference; and
       wherein the server includes a second data store storing device data for the presentation device; and
       wherein the device data identifies the presentation device operating system.

16. The system of claim 12,
wherein the presentation device operating system is an Android operating system.

17. The system of claim 12,
wherein the presentation device operating system is an APPL iOS operating system.

18. The system of claim 12,
wherein the first, non-transient, computer instructions further instruct the hub to perform operations comprising:
  determining a present setting for the presentation device; and
  instructing the presentation device to reset to a default setting.

19. A system comprising:
a presentation device executing a presentation device operating system; and
a hub coupled to the presentation device, further comprising:
  a hardware processor operable to execute:
    first, non-transient, computer instructions which instruct the hub to perform operations comprising:
      receiving a technical condition for a first content;
      receiving a presentation preference for a user;
      generating, based on the technical condition and the presentation preference, a presentation instruction for the first content;
      determining the presentation device operating system;
      determining whether the presentation instruction is supported by the presentation device operating system;
        when supported, outputting a condition instruction which instructs the presentation device to implement the presentation instruction; and
        when not supported,
          converting the presentation instruction into a second presentation instruction supported by the presentation device operating system; and
          outputting, based on the second presentation instruction, a converted condition instruction which instructs the presentation device to implement the second presentation instruction;
  wherein the presentation device, pursuant to the converted condition instruction, presents the first content to the user; and
  wherein the first, non-transient, computer instructions further instruct the hub to perform operations comprising:
    instructing the presentation device to reset to a default setting based upon at least one of the hub:
      receiving an indication that a user of the presentation device has departed from a hotel room housing the presentation device;
      receiving a user input requesting a resetting of the presentation device to the default setting;
      receiving a calendar setting indicating a schedule departure time for the user from the hotel room; and
    receiving an indication that an elapsed time setting has expired.

20. The system of claim 12,
wherein the first, non-transient, computer instructions further instruct the hub to perform operations comprising:
  receiving an identification of the user;
  receiving information identifying a room, for a hotel, assigned to the user;
    wherein the room is associated with the presentation device;
  receiving an indication that the user has checked into the hotel;
  establishing a web socket with the presentation device.

* * * * *